Patented Apr. 2, 1940

2,195,580

UNITED STATES PATENT OFFICE 2,195,580

SOUND ABSORBING COMPOSITION

Kenneth S. Rankin, Toronto, Ontario, Canada

No Drawing. Application March 4, 1938,
Serial No. 193,919

2 Claims. (Cl. 106—24)

This invention relates to a material adapted to be applied as a surface coating to walls for the purpose of absorbing sound waves and to effectively resist the transference of heat and the absorption of moisture so that buildings and rooms may be rendered "soundproof" and so that even temperatures and humidity may be effectively retained.

Numerous materials have been proposed for use in coating walls which have sound-absorbing qualities but most of these are hygroscopic and readily absorb moisture or are of such a nature as to absorb and transfer heat and it is the principal object of this invention to provide a material which may be readily applied to structural surfaces at comparatively low cost and will effectively resist the transference of sound, heat and moisture, and which will also present a fire-resisting surface.

The invention consists in the novel composition and admixture of materials in or about the following proportions:

Mineral wool, 3 parts by weight,
Asbestos, 2 parts by weight,
Diatomite, from 10% to 20% by weight of the total weight of the mineral wool and asbestos,
Lithopone or titanium oxide, 1% by weight of the total weight of the mineral wool and asbestos.

The above materials are thoroughly mixed in a dry state and a quantity, approximately 1 part by weight of a saponified sizing is then thoroughly commingled with two parts of the previously mixed materials.

The saponified sizing which is preferred comprises an admixture of a vegetable or animal oil or wax about four parts by weight, glue about three parts by weight, alum about two parts by weight, and an alkali saponifier about one-quarter part by weight.

Water is added to the admixture of the sizing materials in an amount about equal to the total weight where a mouldable mass is desired or when a more plastic mass is required for spreading in plastic form over surfaces, the quantity of water may be increased to effect the desired plasticity.

A substance produced by the above admixture of materials will adhere to surfaces such as metal, fibre, plastic or wood and when spread over a surface for a thickness of from one-eighth of an inch to one inch or even more, produces a covering which may be troweled smooth and when dry is impervious to water, is fire-proof and effectively absorbs sound waves, so that sound produced in a room, the walls of which are lined with this material, will be deadened and sounds will not carry through to adjacent rooms, nor will they be reflected back to cause magnified or repeated noises within the room.

The resistance to heat and moisture prevents absorption of such from the air, consequently the air may be retained at a desired temperature and humidity for much greater than usual periods and the transference of heat or moisture from outside sources will also be prevented.

What I claim as my invention is:

1. A composite material comprising three parts by weight mineral wool, two parts by weight asbestos, diatomite 10% of weight of the combined mineral wool and asbestos and a saponified sizing in the proportion of one to two parts of the combined wool, asbestos and diatomite, said sizing comprising an admixture of a fatty substance by weight about four parts, glue about three parts, alum about two parts and an alkali saponifier about one-quarter part.

2. A composite material comprising approximately three parts by weight of mineral wool, approximately two parts by weight of asbestos, Diatomite approximately 10% to 20% of the total weight of mineral wool and asbestos, and approximately one part by weight of a saponified sizing to two parts of the above admixture.

KENNETH S. RANKIN.